April 21, 1925.

J. B. LADD 1,534,125

BOX BLANK FORMING MACHINE

Filed July 19, 1923    11 Sheets-Sheet 2

INVENTOR

BY

ATTORNEYS

April 21, 1925. 1,534,125
J. B. LADD
BOX BLANK FORMING MACHINE
Filed July 19, 1923 11 Sheets-Sheet 5

INVENTOR
BY
ATTORNEYS

April 21, 1925.                                            1,534,125
J. B. LADD
BOX BLANK FORMING MACHINE
Filed July 19, 1923        11 Sheets-Sheet 6
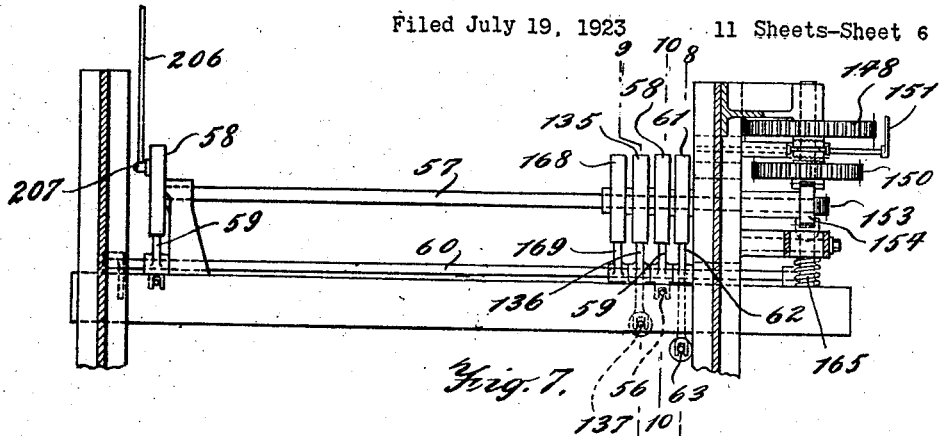
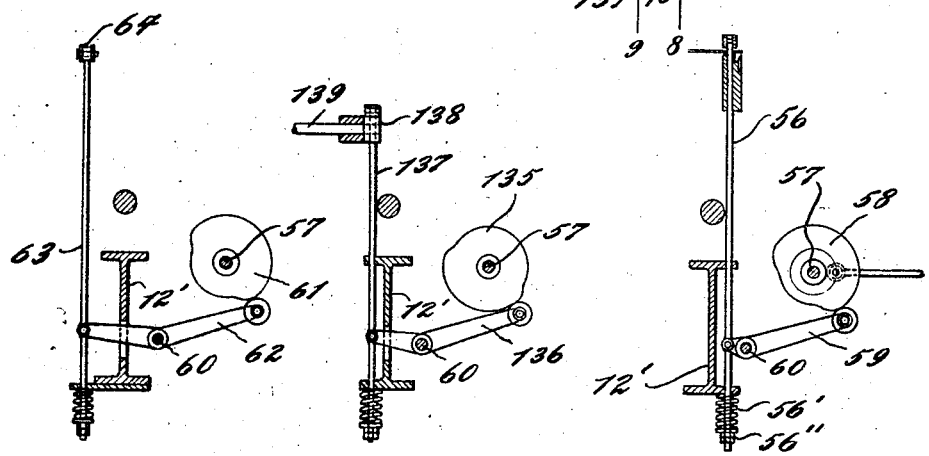
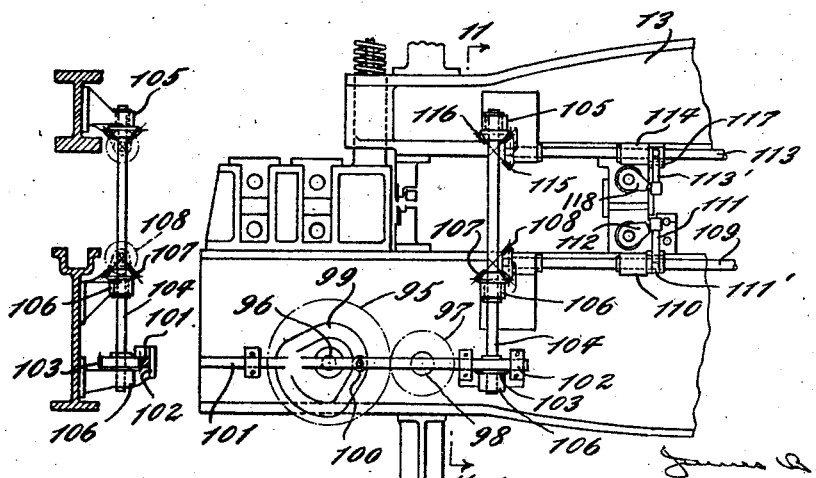
INVENTOR
BY
ATTORNEYS

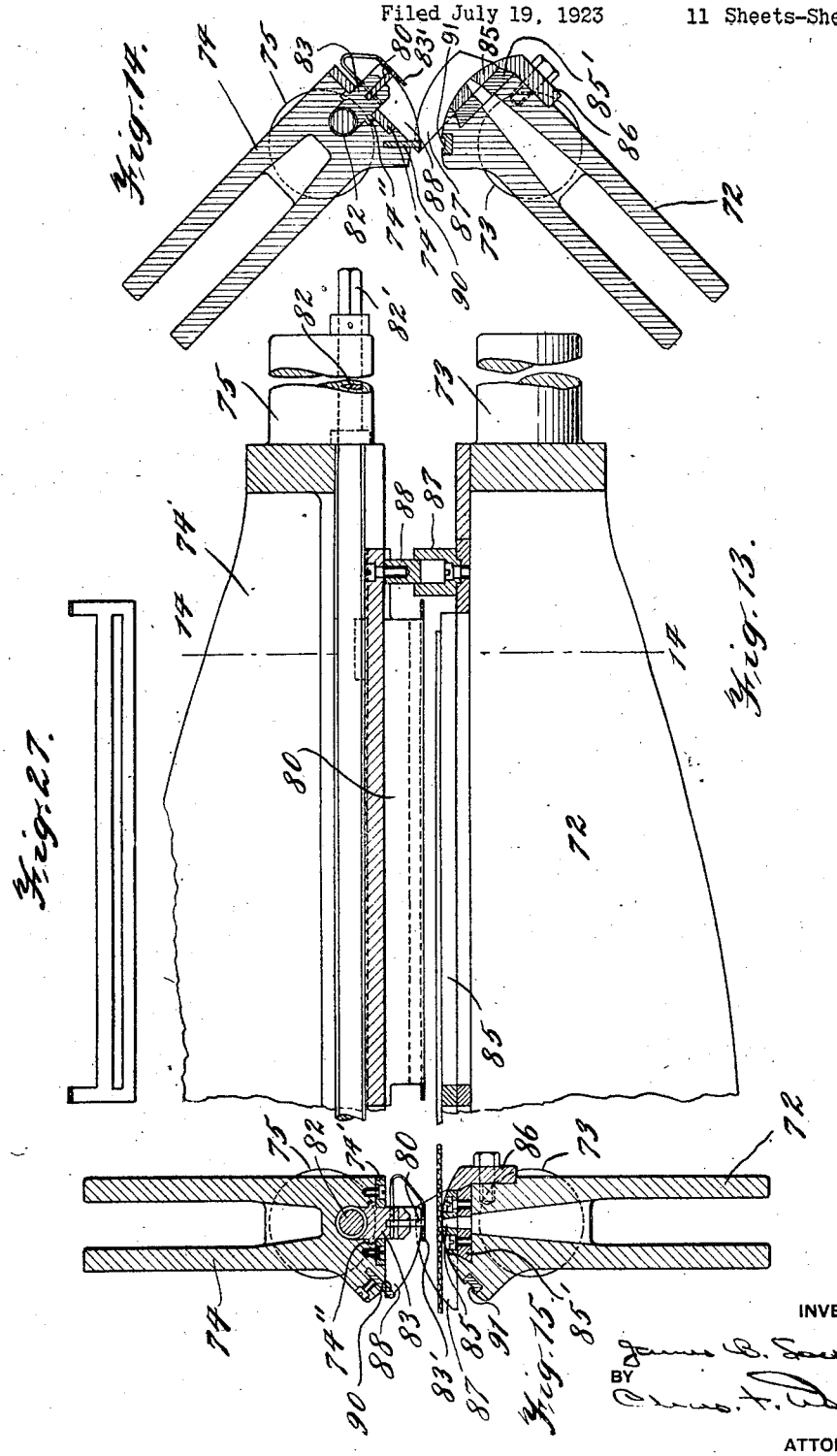

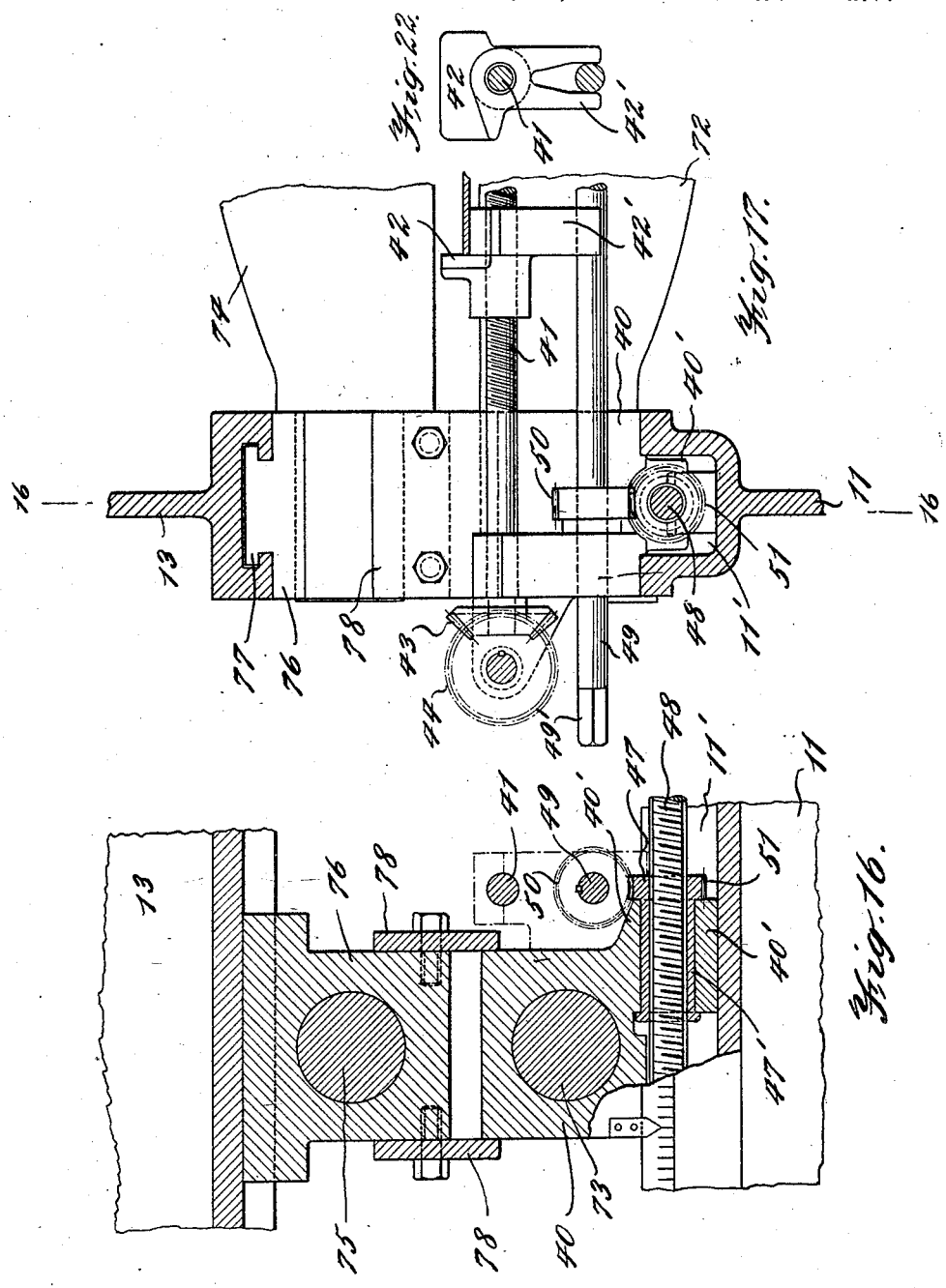

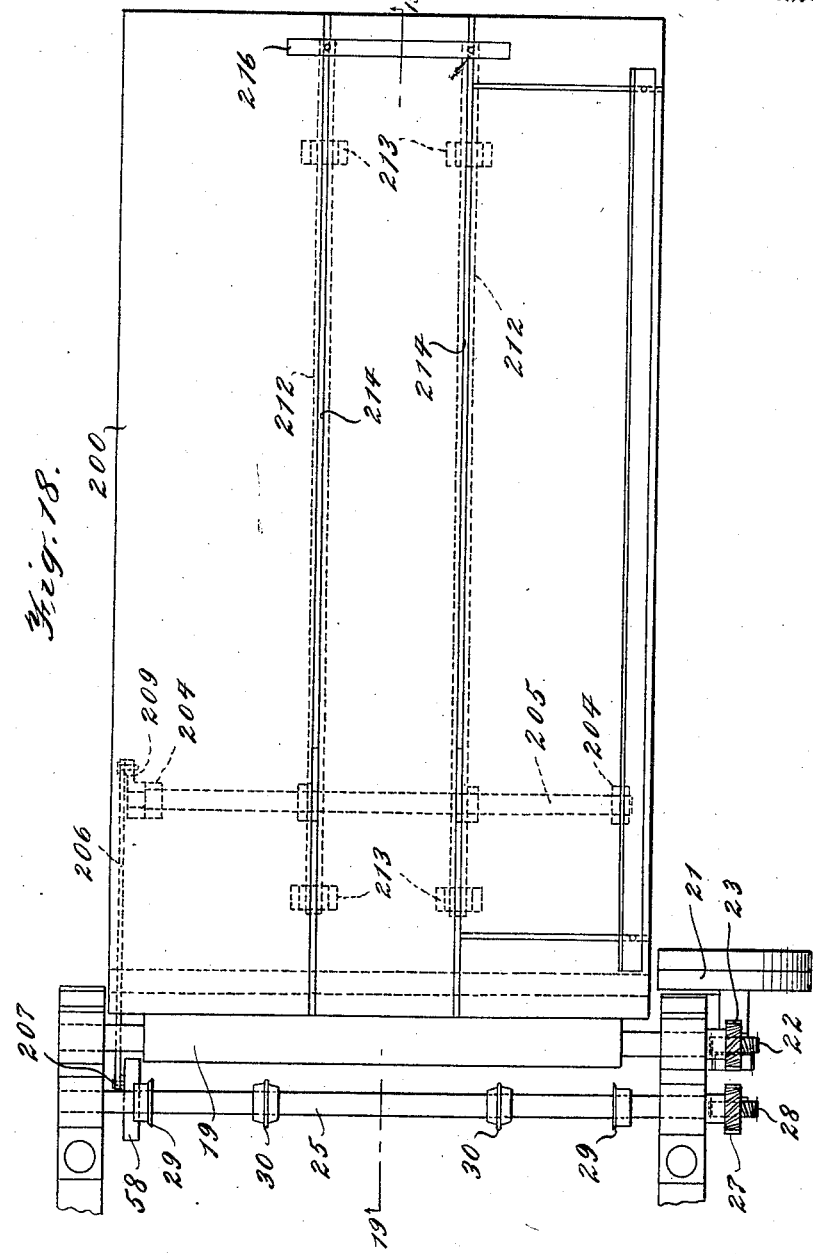

April 21, 1925.
J. B. LADD
1,534,125
BOX BLANK FORMING MACHINE
Filed July 19, 1923    11 Sheets-Sheet 10
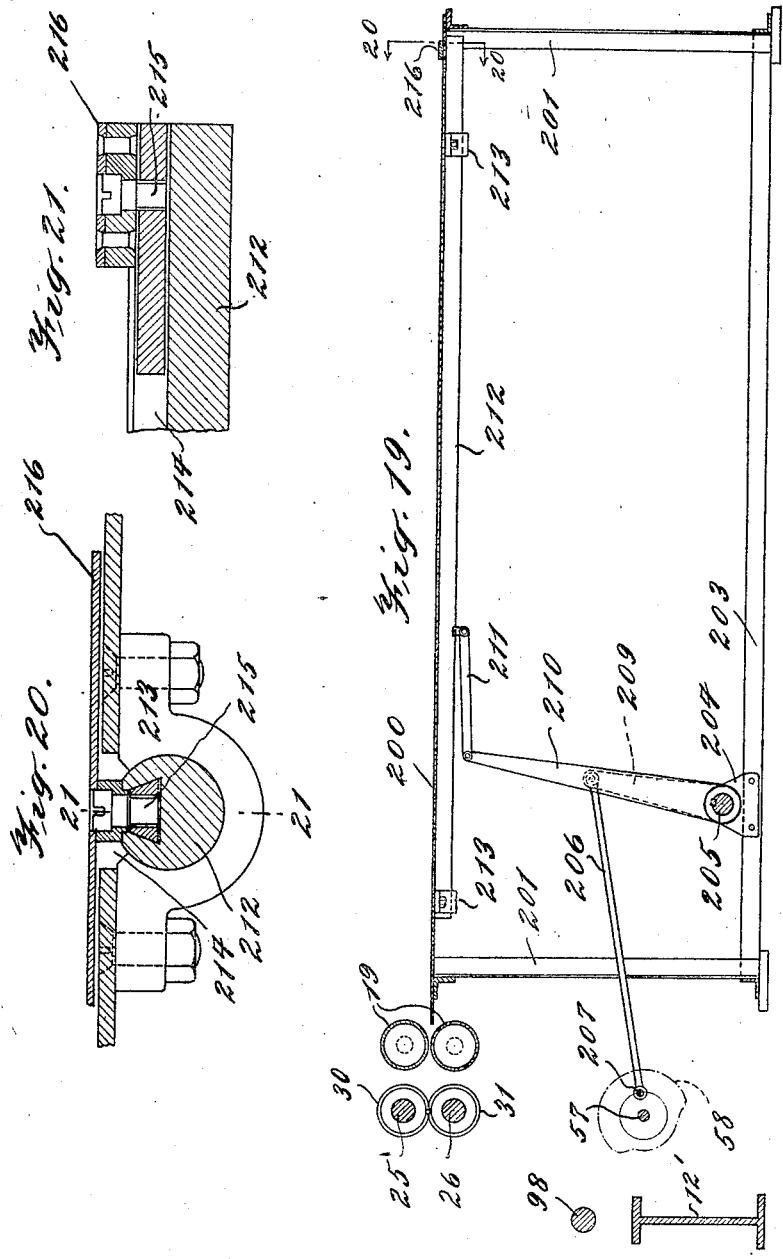
INVENTOR
BY
ATTORNEYS

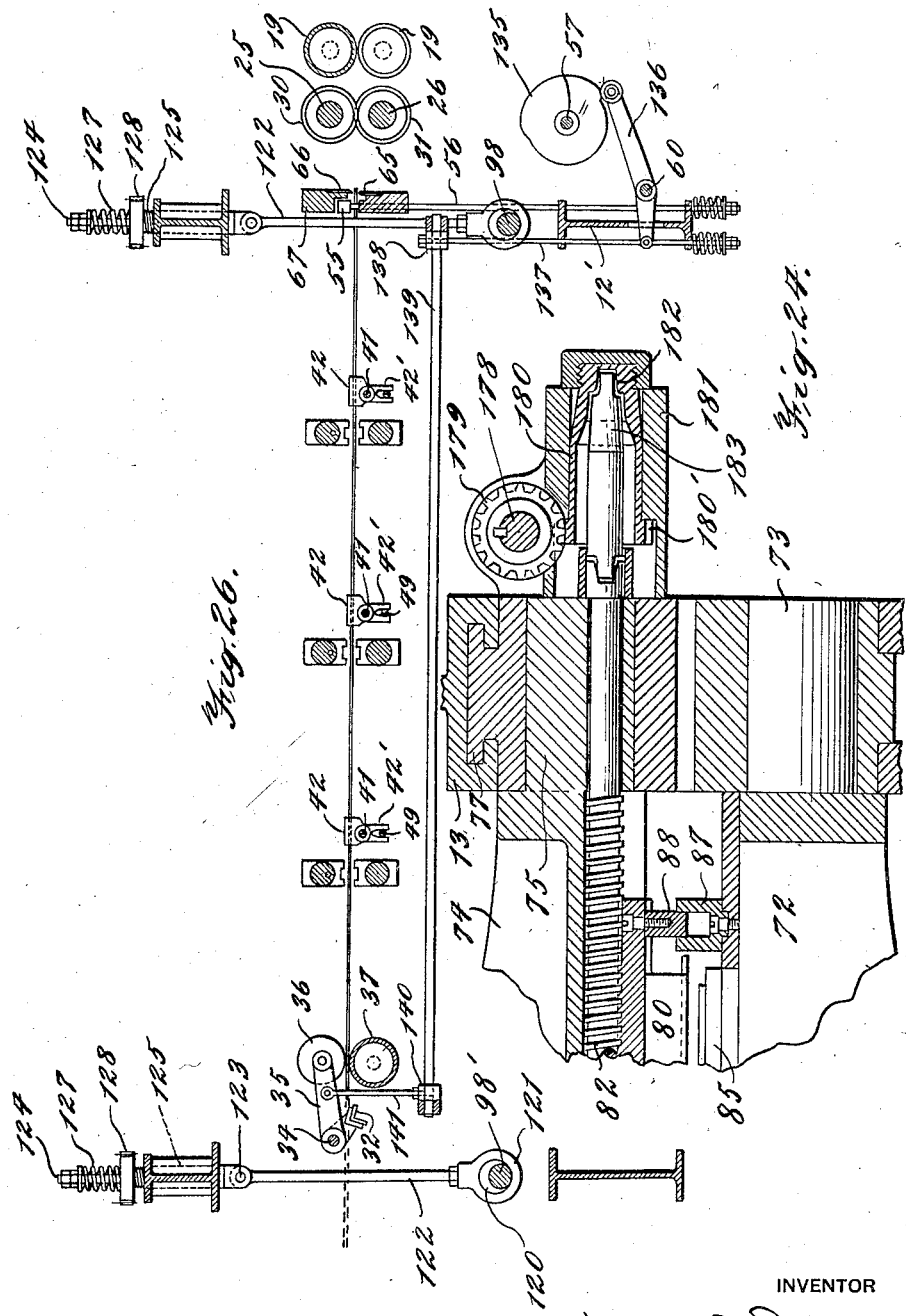

Patented Apr. 21, 1925.

1,534,125

UNITED STATES PATENT OFFICE.

JAMES B. LADD, OF ARDMORE, PENNSYLVANIA, ASSIGNOR TO M. D. KNOWLTON COMPANY, OF ROCHESTER, NEW YORK, A CORPORATION OF NEW YORK.

BOX-BLANK-FORMING MACHINE.

Application filed July 19, 1923. Serial No. 652,530.

*To all whom it may concern:*

Be it known that I, JAMES B. LADD, a citizen of the United States, and a resident of Ardmore, in the county of Montgomery and State of Pennsylvania, have invented certain new and useful Improvements in Box-Blank-Forming Machines; and I do hereby declare the following to be a full, clear, and exact description of the invention, such as will enable others skilled in the art to which it appertains to make and use the same.

This invention relates to a machine for forming paper box blanks, and, briefly, the invention has as its object to furnish a machine of this kind in which the several operations incident to the production of the blanks may be automatically performed in a manner to produce blanks which are absolutely uniform in all particulars.

The machine embodying the invention is adapted to feed sheets of paper or cardboard, trim them to the required size, crease the blanks along folding lines and cut out, at the proper points, any necessary portions for the formation of flaps.

The machine is of the type adapted to form a plurality of longitudinal or flap creases, and also a plurality of transverse or panel creases, each positioned in alignment with and between transversely extending slots or cuts, which separate the flaps.

The particular object of the invention is to effect the formation of the transverse or panel creases and the aligned cuts without moving the blank between the two operations, thereby insuring absolute registration or alignment of the creases and cuts.

Further objects of the invention are to provide a machine having a wide range of adjustability so that blanks of different shapes and sizes may be produced in the same machine; to provide means for varying the speed of the machine; to afford positive feeding means for supplying the blanks to the machine, and for removing them therefrom; to provide adjustments whereby the machine may be readily adapted for operation upon materials of different thickness, and, in general, to afford a machine which is of comparatively simple construction and which, in operation, is positive and will produce a uniform product.

Other objects of the invention, which may be more clearly set forth in connection with the description of the details of the machine embodying the inventive idea, will become apparent as the description proceeds. In the accompanying drawings, wherein one embodiment of the invention is disclosed:—

Fig. 7 is a horizontal sectional view on the line 7—7 of Fig. 1, showing the timing mechanism;

Fig. 8 is an elevational view of the operating mechanism for the side grips and centering devices taken approximately on the line 8—8 of Fig. 7.

Fig. 9 is an elevational view of the operating mechanism for the run-out rollers, taken approximately on the line 9—9 of Fig. 7;

Fig. 10 is an elevational view of the operating mechanism for the clamp, taken approximately on the line 10—10 of Fig. 7;

Fig. 11 is a fragmentary vertical section on the line 11—11 of Fig. 12.

Fig. 12 is a fragmentary side elevational view taken from the opposite side of the machine from that shown in Fig. 1;

Fig. 13 is a fragmentary elevation of a pair of cutting and creasing bars;

Fig. 14 is a section of the cutting and creasing bars on the line 14—14 of Fig. 13 showing the creasing means in operative position;

Fig. 15 is a view similar to Fig. 14 but showing the cutting devices in operative position;

Fig. 16 is a section on the line 16—16 of Fig. 17 showing the mounting for the cutting and creasing bars;

Fig. 17 is a fragmentary cross section in front of one of the pairs of cutting and creasing bars showing the mounting for the latter as well as the mechanism for adjusting the same longitudinally of the machine;

Fig. 18 is a top plan of a suitable mechanism for feeding the material into the machine;

Fig. 19 is a longitudinal section through the in-feed table taken on the line 19—19 of Fig. 18.

Fig. 20 is a sectional detail on the line 20—20 of Fig. 19;

Fig. 21 is a sectional detail on the line 21—21 of Fig. 20;

Fig. 22 is a detail view showing the mounting for the side gripping blocks;

Fig. 23 is a fragmentary horizontal section taken on a line passing through the bearings for the upper series of cutting and creasing bars, showing a means for simultaneously adjusting the cutting knives transversely to accommodate the machine to blanks of different widths;

Fig. 24 is an enlarged section on the line 24—24 of Fig. 23;

Fig. 25 is a view of the blank produced by the machine;

Fig. 26 is a longitudinal section showing more clearly the operating mechanism for the feed-out roller;

Fig. 27 is a detail view of a knife stripper; and

Fig. 28 is a detail view showing the means for vertically adjusting the carrying frame for the vertically reciprocating cutter and creaser bars.

Referring to Fig. 25, it will be noted that the blank produced by the machine comprises four panel or body wall sections A, B, C and D, at the ends of which are flaps $a$, $b$, $c$ and $d$, separated by transverse slits $e$. Extending longitudinally of the blank are the parallel flap creases $f$ which are intersected by the panel creases $g$, the latter being positioned in alignment with and between the flap separating cuts $e$.

In producing a blank of this character it is essential that the panel creases $g$ be absolutely in alignment with the flap separating cuts $e$, and it is an important object of this invention to insure this alignment, which is accomplished by the maintenance of the blank in fixed position while both the panel creases and cuts are produced. Preferably, all of the creases are produced in a single operation, and all of the cuts are produced simultaneously.

Referring now to the machine (Figs. 1, 2 and 3), 10 indicates a stationary base or sub-frame on which the several operating parts of the machine are mounted, the same as here shown comprising a pair of side members 11, 11, resting adjacent their opposite ends on transverse end members 12, 12.

Figure 3:
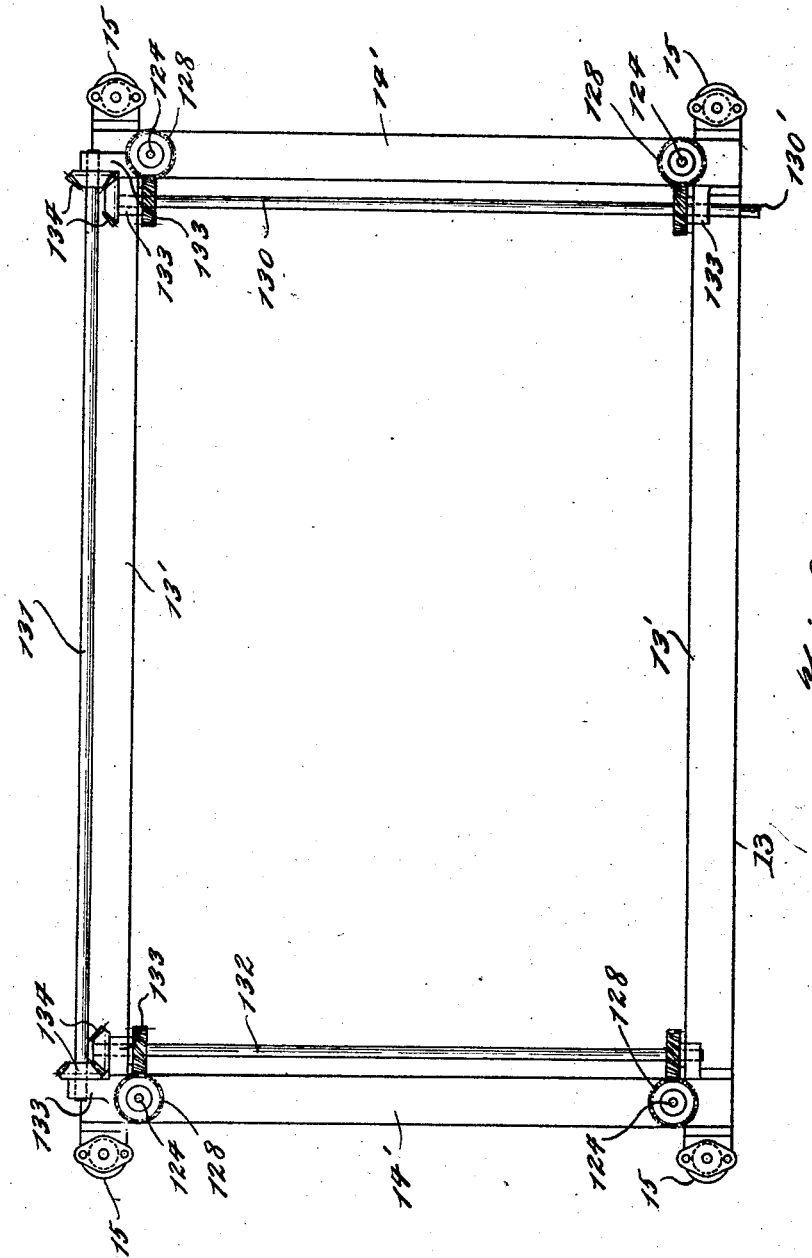
Fig. 3 is a top plan of the upper and vertically movable frame omitted from the showing in Fig. 2.

Positioned above the base 10 is a vertically reciprocating frame 13, substantially rectangular in outline, as shown in Fig. 3, and comprising side members 13', 13', and connecting end members 14', 14', the side members having, at their ends, extensions 15 provided with openings which receive vertical guide pins 16 upon the base, these guide pins serving to guide the top frame in its reciprocating movements which are imparted thereto by mechanism to be later described. The guides 16 at their upper ends carry headed pins 17 on which are mounted buffer springs 18 which engage the upper surfaces of the frame extensions 15 and yieldingly oppose upward movement of the frame.

Figure 1:
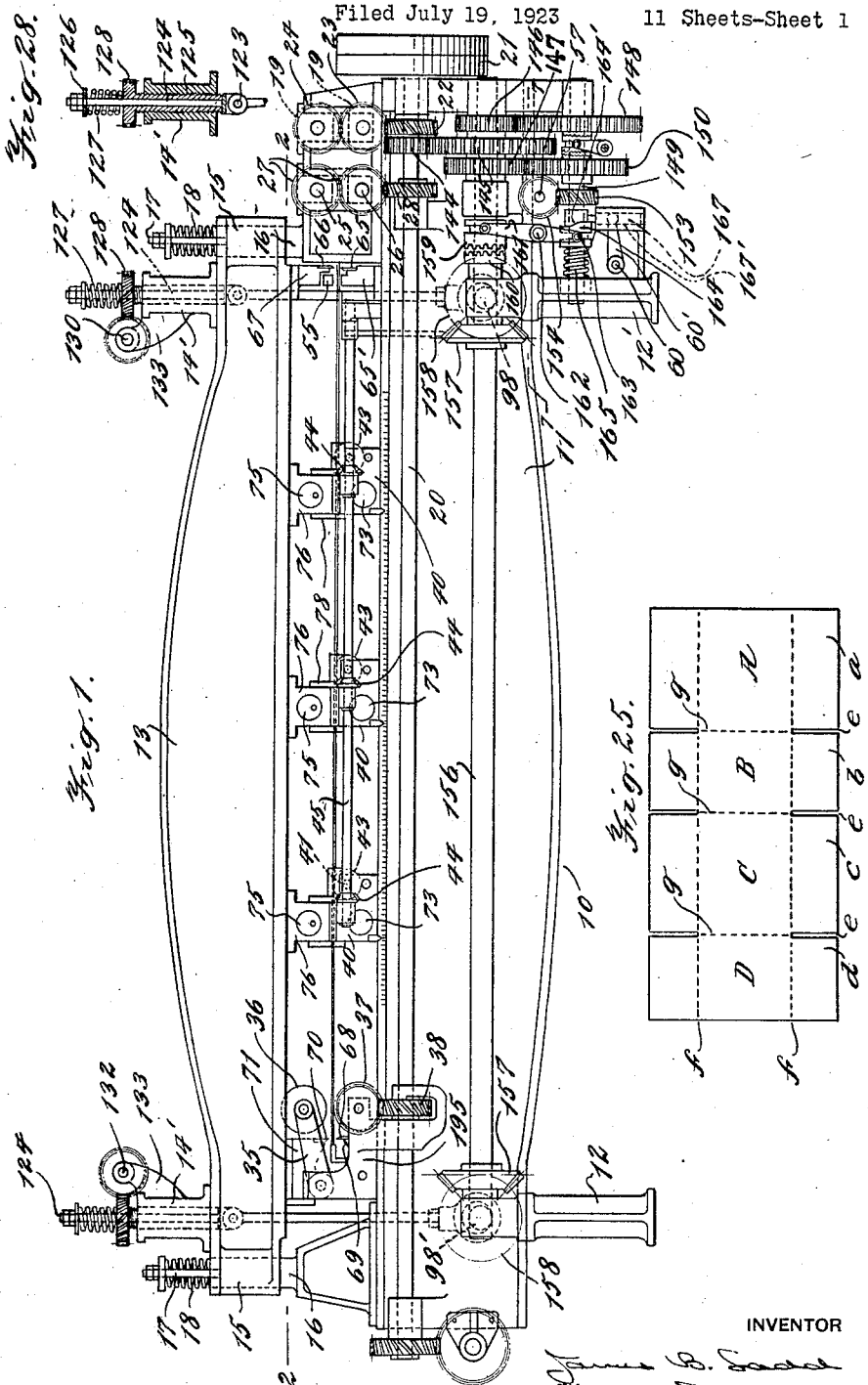
Fig. 1 is a side elevational view.
Figure 2:
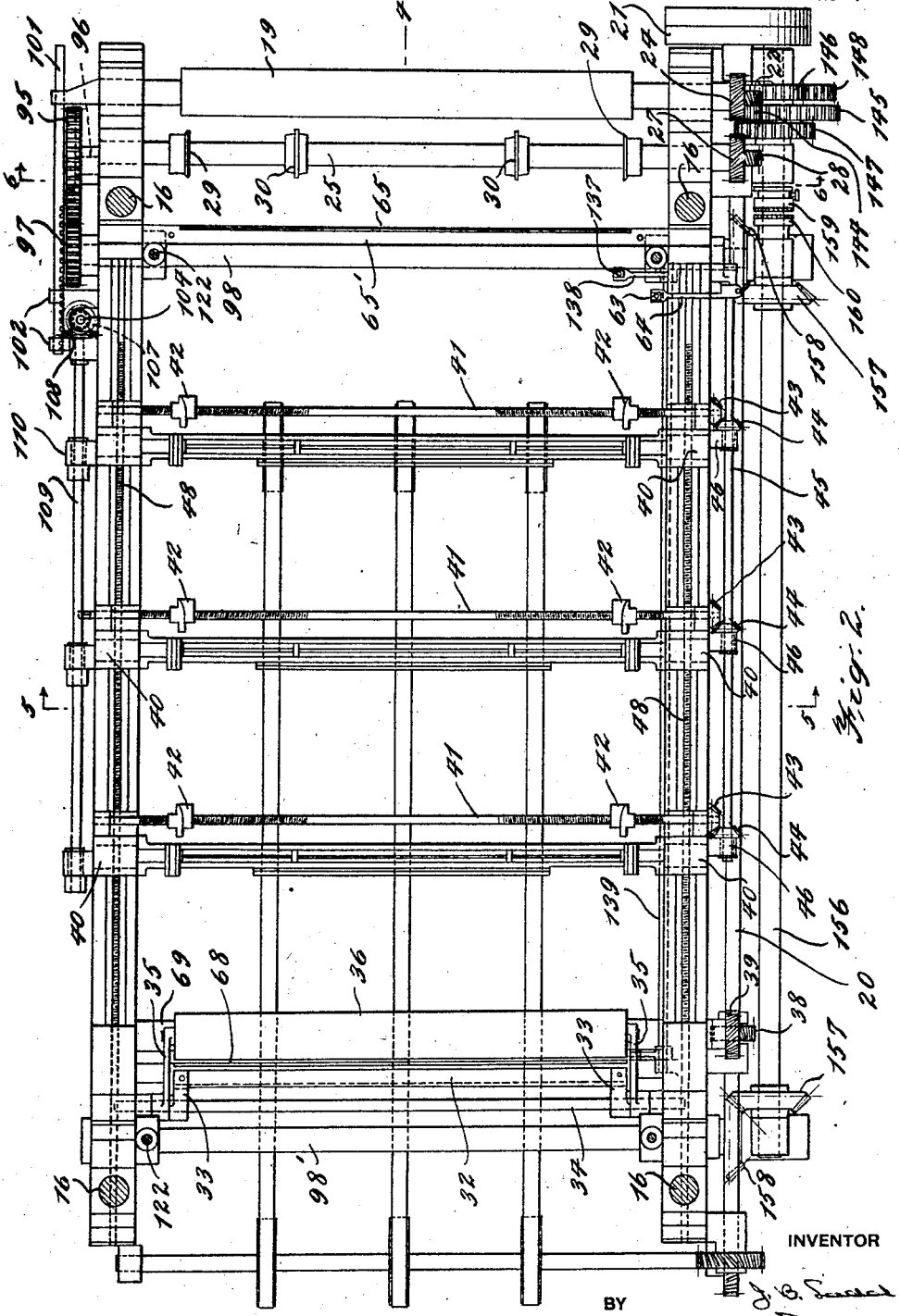
Fig. 2 is a horizontal section taken approximately on the line 2—2 of Fig. 1.

The sheets are fed into the machine between a pair of feed rollers 19, 19, mounted upon the base 10 at the front end of the machine, and driven from a power shaft 20 by a gear 22 thereon meshing with one of a pair of intermeshing gears 23 and 24 on the feed rollers (Figs. 1 and 2). The power shaft 20 is mounted in bearings on one of the side members of the base, as shown in Fig. 1, and is provided at one end with a drive pulley 21.

Figure 4:
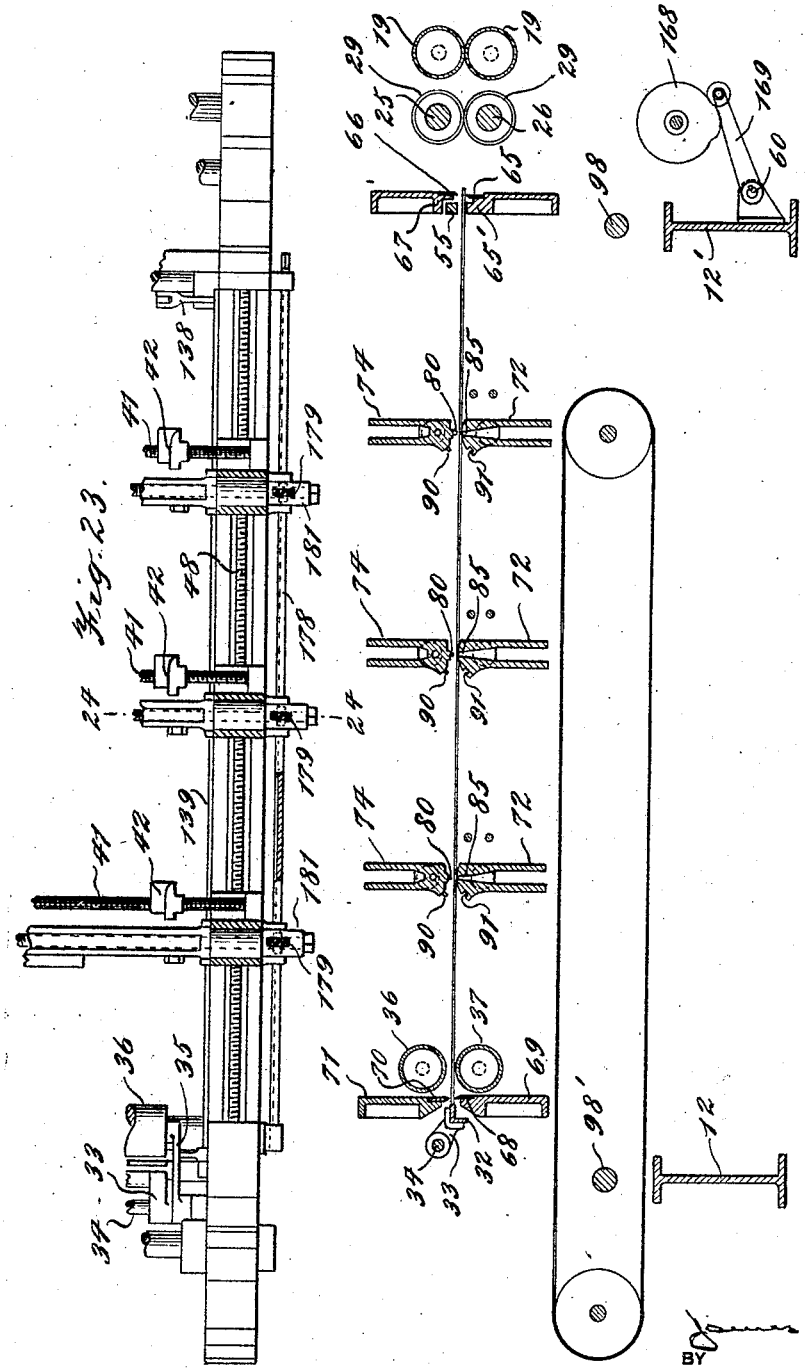
Fig. 4 is a longitudinal section on the line 4—4 of Fig. 2.
Figure 6:
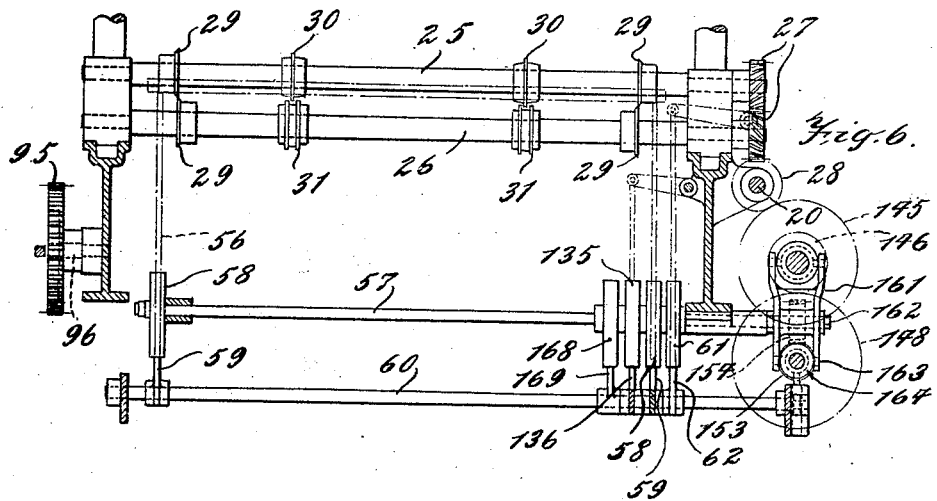
Fig. 6 is a vertical section on the line 6—6 of Fig. 2.

From the feed rollers, the sheet passes between a pair of vertically aligned shafts 25, 26 (Fig. 6) rotated in opposite directions through gearing 27 by means of a gear 28 on the power shaft 20. The shafts 25 and 26 carry cooperating pairs of edge trimming knives 29, 29, and the usual male and female creasing devices 30, 31, which latter, as the sheet is passed between the shafts, serve to form the longitudinal or flap creases $f$ (Fig. 25). These edge trimmers and creasing devices may be adjusted transversely of the shafts in any suitable manner to accommodate the machine to form blanks of various sizes. The blank is fed, by means of the feed rollers, longitudinally of the machine, until its front end engages a stop plate 32 mounted, at the rear end of the machine, upon arms 33 (Figs. 2, 4 and 26) carried by a transverse rock shaft 34. The shaft 34 also carries a pair of forwardly projecting arms 35, 35, fixedly mounted upon the shaft and supporting, between them, a presser roller 36 which is positioned directly above a feed-out roller 37 continuously driven from the shaft 20 by means of gears 38, 39 (Fig. 2). Mechanism is provided (to be later described) for moving the stop plate 32 downwardly out of the path of the blank and simultaneously lowering the presser roller 36 against the blank, so that rotation of the feed-out roller will carry the blank out of the machine.

When the end of the blank is brought into engagement with the stop plate 32, mechanism is automatically operated to center the blank by means of side clamps or guides. Referring now to this feature of the machine, the side members 11 of the base 10 carry a plurality of journal blocks 40 (Figs. 2, 16 and 17), into which extend the opposite ends of threaded rods 41 carrying clamping and centering devices 42 threaded on the rods and adapted to be moved toward and from one another by rotation of the rods, which is accomplished by means of bevel gears 43 on said rods meshing with bevel gears 44 upon a shaft 45 journaled in outwardly extending brackets 46 on the blocks 40. The bevel gears 44 are keyed to the shaft 45 so that they may be rotated therewith and, at the same time, may move longitudinally of the shaft with the journal blocks 40, which are adjustable longitudinally of the base for the purpose of accommodating the centering devices to different size blanks, as well as for adjusting the creasing and cutting means, which is also carried by these journal blocks. For this purpose the blocks have depending lugs 40′ (Figs. 16 and 17) extending into channels 11′ in the tops of the side members 11 of the base. Carried by these lugs are rotatable nuts 47 having sleeve portions 47′ projecting within the lugs and surrounding threaded rods 48 which are fixedly positioned and held against rotation within the channels 11′. The nuts 47 on each pair of blocks 40 may be independently rotated by means of a shaft 49 rotatably mounted in the blocks 40 below the rod 41 and carrying a pinion 50 meshing with teeth 51 formed on the nut 47. At this point it may be noted, by reference to Figs. 17 and 33, that the centering clamps 42 have depending forks 42′ straddling the shaft 49, whereby said clamps are held against rotation with their supporting shafts 41. Obviously, rotation of the shaft 49 by engagement of a suitable crank or other operating tool with its squared projecting end 49′, will result in movement of the particular pair of journal blocks 40 in which it is mounted, together with the clamps and clamp rod, longitudinally of the base.

To repeat, up to this point the mechanism has been described whereby the blank is centered in the machine by means of the side guides or clamps 42. Power is applied for operating this mechanism in a manner to be later described. In addition to the side clamps which hold the blank to its centered position in the machine, the blank is additionally held by means of a clamping bar 55, operative to engage its upper side adjacent the rear end thereof. This bar is carried at the upper ends of a pair of vertically reciprocating pitmen 56 (Figs. 4 and 10) which have bearings in a cross beam 12′ on the base. The pitmen 56 and connected clamp bar 55 are reciprocated from a cam shaft 57 (Figs. 6 and 7) having cams 58 engaging rocker arms 59 pivotally mounted upon a shaft 60 and connected, at their opposite ends, to the pitmen 56. Springs 56′, expanding between the under side of the beam 12′ and nuts 56″ on the lower ends of the pitmen 56, act to yieldingly hold the latter in a lowered position with the bar 55 in clamping position and the rocker arms 59 in operative engagement with the cams 58. The shaft 57 also carries the cams which actuate the stop plate 32 and side clamps 42 in timed relation. A cam 61 (Figs. 6, 7 and 8) on this shaft engages one end of a rocker arm 62 pivotally mounted upon shaft 60, the opposite end of which arm extends through the beam 12′ and is connected to a pitman 63 which, at is upper end, is pivotally connected to an arm 64 (Fig. 2) fixedly secured to the shaft 45 carrying the bevel gears 44 which actuate the side clamp shafts 41. Operation of the pitman 63 from cam 61 results in rocking of the shaft 45 and alternate gripping and releasing of the blank at its opposite side edges by the clamps 42, while operation of the pitmen 56 from cam 58 results in alternate clamping and releasing of the blank at its upper side by the bar 55, the clamping and releasing in both cases taking place substantially simultaneously.

Adjacent its front end the base 10 carries (Figs. 1 and 2) a stationary cross-bar 65′ with the upper edge of which the clamping bar 55 cooperates in clamping the blank in the manner just described. Mounted on this cross-bar is a knife 65 adapted for cooperation with a knife 66 carried by a cross-bar 67 on the upper reciprocating frame 13, while at the rear end of the machine adjacent the stop plate 32 is a second pair of similarly mounted knives 68 and 70, the knife 68 being mounted on a cross-bar 69 on the base 10 and the knife 70 being mounted on a cross-bar 71 carried by the upper frame 13. Subsequent to the centering of the blank by the side grips or clamps 42 and its clamping by the bar 55, the frame 13 is moved downwardly and causes the knives 66 and 70 carried thereby to cooperate with the lower knives 65 and 68 and shear the blank at its opposite or front and rear ends. While the blank is still held in fixed position by the side grips 42 and the top clamp 55, mechanism is operated to form the panel creases $g$ and to cut the slots $e$. This mechanism will now be described.

Figure 5:
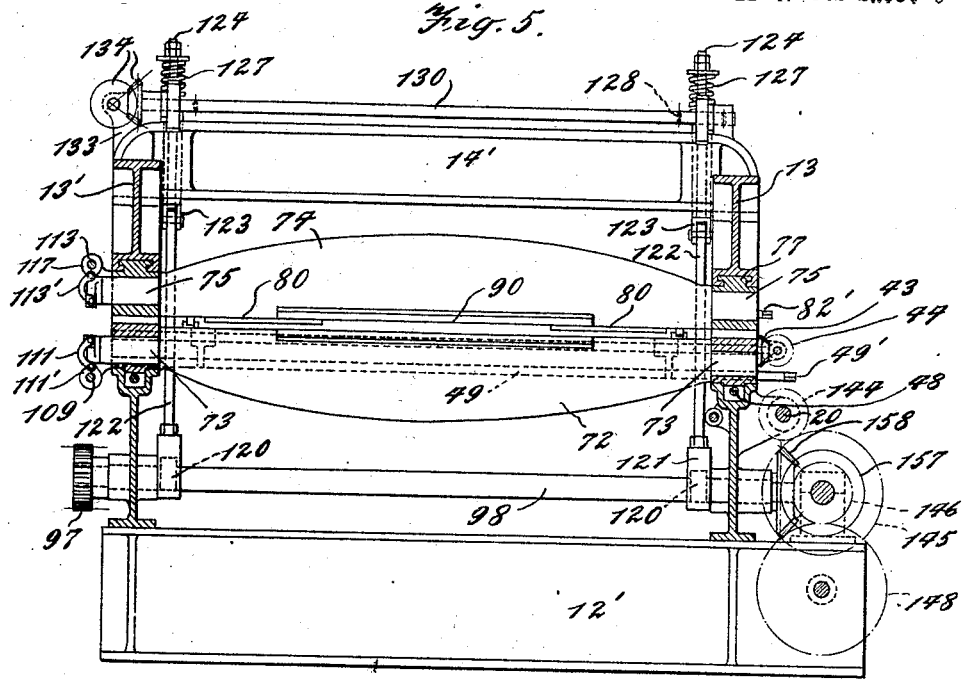
Fig. 5 is a vertical section on the line 5—5 of Fig. 2 looking in the direction of the arrows.

The blocks 40 on the base 10 carry cross-bars 72 (Figs. 4, 5, 16, 17 and 23) which are journaled at their ends 73 in bearings within said blocks whereby the bars may be rotated. The upper vertically movable frame 12 carries similar cross-bars 74 which are also journaled at their ends 75 in bearing blocks 76 which have T-shaped tongues 77 received within corresponding T grooves (Fig. 5) in the lower edges of the side members 14 of the upper frame. The upper blocks 76 and lower blocks 40 are maintained in vertical alignment by means of plates 78 secured to opposite faces of the blocks 76 and having depending portions slidably engaging the opposite faces of the blocks 40. Due to these plates 78, which permit the blocks 76 on the upper movable frame to move vertically relative to the lower blocks 40, when the blocks 40 are moved longitudinally of the base in the manner hereinbefore referred to, the upper blocks are also caused to be moved longitudinally of the top frame whereby both upper and lower sets of blocks and their supported cross-bars are constantly maintained in the same vertical plane.

Referring more particularly to Figs. 5, 13, 14 and 15, each of the cross-bars or crossheads 74 carries spaced male dies or knives 80, 80, for cooperation with spaced female dies 85, 85, on the lower cross-bars 72 in cutting the slots e in the opposite sides of the blank (Fig. 25). The male dies 80 are secured in grooved die holders 83, which latter are slidably mounted in grooves in the lower edges of the cross-bars and removably held therein by detachable plates 74' on the cross-bars engaging longitudinal ribs 74'' on the holders. The holders 83 are threaded at their inner edges and engaged by a threaded adjusting rod 82 rotatably mounted in the cross-bar. This rod 82 is oppositely threaded so that rotation of the same by means of its squared end 82' (Fig. 13) will result in movements of the engaged die holders and dies toward and from one another longitudinally of the supporting cross-bar. This permits the accommodation of the dies or knives to blanks of varying widths. It will be noted that the die holders 83 carry strippers 83' which act to prevent adhering of the blanks to the die members.

Each of the female dies 85 is mounted on a carrier plate 85' slidably supported in the upper grooved side of the supporting crossbar for adjustment laterally of the machine and is adapted to be held in adjusted position by means of a clamping plate 86. Each of these lower or female dies is maintained in registration with the cooperating male die on the superposed cross-bar by means of a depending lug or guide member 88 on the male die holder fitting within a transversely grooved socket member 87 on the lower die carrier 85'. The sliding fit between these members 87 and 88 is such as to permit vertical movement of the top die relative to the lower die, and simultaneous rotation of the two cross-bars 72 and 74 from the position shown in Fig. 14 to the position shown in Fig. 15 and vice versa, but lateral movement of the male die longitudinally of its supporting cross-bar will effect simultaneous adjustment of the female die 85 along its crossbar 72.

Upon the cross-bars 72 and 74 are also mounted the means for forming the panel creases g (Fig. 25), which consists of a male creasing member 90 upon the upper crossbar 74 and a female creasing member 91 upon the lower cross-bar 72. These creasing devices are positioned relative to the cutting or slotting devices so that, upon rotation of the bars from the position shown in Fig. 15 to the position shown in Fig. 14, the cutting devices will be moved away from operative position and the creasing devices will be moved into operative position. The cutting and creasing cross-bars 72, 74 are automatically rotated to bring the cutting devices and the creasing means, alternately, into operative position so that, upon two reciprocations of the top frame and while the blank is maintained in fixed position by the side grips and clamping bar, all of the panel creases and transverse cuts will be formed. The means for thus rocking the cross-bars 72 and 74 is more clearly shown in Figs. 2, 5, 11 and 12, and comprises a gear 95 mounted upon a stub shaft 96 and driven from a gear 97 mounted upon the end of an intermittently driven shaft 98 extending transversely of the machine substantially beneath the front cutter blades 65, 66. The gear 95 has, in its outer face, a cam track 99 in which is a follower 100 mounted upon a reciprocating rack-bar 101 carried by brackets 102. The rack 101 engages a spur gear 103 keyed upon a vertical shaft 104 which reciprocates slightly and is supported from a bracket 105 in the upper reciprocating frame 13. The shaft 104 also slidably extends through brackets 106 on the base 10 and has keyed thereto a bevel gear 107 which meshes with a bevel gear 108 upon a shaft 109 extending longitudinally of the base and mounted in side brackets 110 thereon. The shaft 109 is rocked by the reciprocation of the rack 101 from cam 99, and, by means of links 111 connecting arms 111' on said shaft with arms 112 on the ends of the cross-bars 72 (Fig. 12), serves to rock the cross-bars and thereby move the creasing and cutting devices thereon alternately to and from their operative position as referred to.

The top series of cross-bars 74 carrying the upper set of cutting and creasing devices are also rotated from the cam 99 and rack 101 by means of a shaft 113 mounted in brackets 114 upon the upper reciprocating frame 13, the said shaft carrying a bevel gear 115 meshing with a bevel gear 116 on the upper end of the vertical shaft 104, and being operatively connected to the several cross-bars 74 by means of links 113' which connect at one end with short arms 117 on said shaft and at their opposite ends with arms 118 fixedly attached to the ends of the cross-bars 74.

The upper frame with the supported cutting and creasing devices is intermittently reciprocated in a vertical direction from the shaft 98 and a parallel shaft 98' at the rear end of the machine, both of said shafts being mounted in the base and carrying eccentrics 120 surrounded by straps 121 (Figs. 1 and 26) to which are connected pitmen 122 extending upwardly and pivotally connected at 123 to rods 124 slidably fitted in sleeves 125 (Fig. 28) which are threaded within openings in the cross beams 14' of the upper frame. The rods 124 carry cap plates 126 which serve as abutments for springs 127 fitted between the plates and gear member 128 at the ends of the sleeves 125. Obviously, rotation of the gears 128 and connected sleeves 125, which are threaded in the openings in the frame, will result in vertical adjustment of said frame. This will vary the distance between the frame and the base 10, upon which the blank is supported, and serves to accommodate the machine to blanks of varying thicknesses. Referring to Fig. 3, it will be noted that a series of shafts 130, 131 and 132 are mounted in brackets 133 upon the frame, and are interconnected by bevel gears 134 so that rotation of the shaft 130, which is accomplished by engagement of its squared end 130', will uniformly adjust the frame at each of its four corners.

After the two vertical reciprocations of the upper frame, between which reciprocations the cutting or slotting devices have been moved out of operative position and the creasing devices have been moved into position automatically, the blank is completed. However, in order that the blank may be removed from the machine it is necessary for the stop plate 32 to be moved. For this purpose, referring to Figs. 2, 9 and 26, a cam 135 on the cam shaft 57, engages one end of a rocker arm 136 pivotally mounted on shaft 60, the opposite end of which arm is pivotally connected to a pitman 137 having bearings in the base beam 12'. This pitman 137 is connected, at its upper end, to an arm 138 fixedly mounted upon a shaft 139 having bearings in brackets on the side members of the base and extending longitudinally of the latter. At the rear end of the base the shaft carries an arm 140 which is connected to a pitman 141, the latter being connected, at its upper end, to one of the arms 35 carrying the presser roller 36. Rocking of the shaft 139 from the cam 135 results in the raising and lowering of the presser roller, which, when lowered, serves to press the blank downwardly against the continuously driven feeding out roller 37. When the presser roller is lowered, the shaft 34 upon which the arms 35 are mounted is rocked to lower the stop plate 32 to the position shown in Fig. 26. The lowering of the stop plate to move the same out of engagement with the blank also lowers the presser roller, and rotation of the feeding-out roller 37 carries the blank out of the machine, the remaining cams upon the cam shaft 57 having previously released the side grips 42 and raised the clamp bar 55.

The mechanisms heretofore described for operating the edge and top clamping devices, as well as the cutting and creasing devices, receive power from the shaft 20, which carries a gear 144 meshing with a gear 145 upon a sleeve which carries gears 146 and 147 of different size. The gear 146 meshes with a gear 148 loosely mounted upon a counter-shaft 149, and the gear 147 meshes with a gear 150 also loosely mounted upon said counter-shaft. Between the gears 148 and 150, a double-faced clutch is keyed to the shaft and is operated by a handle 151 (Fig. 7) so that either the gear 148 or the gear 150, which are continuously driven from the gears 146 and 147, respectively, may be connected with the shaft 149 to rotate the latter, the speed desired determining the gear to be selected. Upon the shaft 149 is mounted a gear 153 which meshes with a gear 154 on the cam shaft 57, and thus the latter will be driven continuously from the power shaft 20. The shafts 98 and 98' adjacent the opposite ends of the machine are intermittently rotated from a shaft 156 carrying bevel gears 157 meshing with bevel gears 158 upon the shafts 98, 98'. The shaft 156 passes through the sleeve carrying the gears 145, 146 and 147, the sleeve being rotatably mounted upon the shaft, and a clutch face 159 is connected with the sleeve and is adapted to be intermittently engaged with a clutch 160 upon the shaft 156. For this purpose a forked lever 161 is connected, at its upper end, to the clutch member 159 and is pivoted at 162 to the base of the machine. The lower end of the lever has a pin 163 engaging a cam block 164 freely slidable longitudinally of the counter-shaft 149 and abutting a spring 165 (Fig. 1), which normally tends to throw the block to the right and effect engagement of the clutch members 159 and 160. The cam block is actuated to maintain the clutch members out of engagement, and is held against actuation by the spring by means of a pin 167 which is slidably fitted in a socket 167' for vertical movement to and from a position for engagement with the cam face 164' of the cam block. Rotation of the shaft 60 from cam 168 engaging an arm 169 fixed on said shaft (Fig. 7) results in vertical reciprocation of the pin 167 through an arm 60' fixed on the shaft 60 with its free end pivotally connecting with the pin (Fig. 1). When the cam 168 rotates, the pin 167 has been lowered from engagement with cam block 164 for a short time, whereupon the spring 165 is free to effect engagement of the clutch members 159 and 160 through the pivoted lever 161. After a given portion of the cycle of operation of the machine, the cam 168 acts to rock the shaft 60 and, through its lever arm 60', again raises the pin 167. During the period that the pin has been lowered, the block 164, which is keyed to the shaft 149, has been rotated by the latter to bring the low part of its cam face opposite the pin whereby the latter, when raised by the lever arm 60' as described, may be moved vertically to a position opposite the cam face 164' of the block and, by engagement with the high part of said cam face during the continued rotation of the block, force the latter toward the left and against the pressure of the spring 165 to operate the lever 161 to disengage the clutch members 159 and 160. It will thus be understood that the clutch members 159 and 160 will be automatically engaged and disengaged to cause intermittent rotation of the shaft 156, which will cause intermittent rotation of shafts 98 and 98'. It will be recalled that from these shafts the upper frame 13 is reciprocated vertically and the cutter and creaser bars are rotated to bring the creasing devices and the cutting devices automatically and alternately into and out of operative position.

Referring to Figs. 23 and 24, there is shown therein means whereby the cutters may be moved transversely of the cross-bars simultaneously. That is to say, means whereby the cutters upon all of the bars may be adjusted together instead of independently, as has been hereinbefore described. To accomplish this result, a shaft 178 is mounted in brackets upon the reciprocating frame 13 and provided with gears 179 meshing with gears 180' formed on sleeves 180 journaled in brackets 181 upon the bearing blocks 76. The gears 179 are keyed to the shafts 178 so that they may be moved longitudinally thereof when the cutter-bar journal blocks are adjusted along the frame. The sleeves 180 have interior squared sockets 182 at one end thereof receiving the squared ends of link pins 183 so that the pins will rotate with the sleeve, the link pins having a driving connection with the shafts 82 which carry the cutters. Thus, by turning the shaft 178 it will operate to rotate the several sleeves 180, and these, through the connecting pins 183, will act to rotate, in unison, all of the shafts 82. Because of the swinging movement of the shafts 82 by reason of their being carried in the oscillating cross-bars 74, the squared ends of the link pins 183 loosely connecting with the sleeves 180 and with the shafts 82, respectively, permit of the said swinging movement of the shafts.

To resume, it will be understood that the machine is susceptible of a wide range of adjustment in order to accommodate the same to different types and sizes of blanks. By rotating the shafts 130, 131, etc. (Fig. 3) of the upper reciprocating frame, the latter may be adjusted vertically to vary the depth of the creases, thereby adapting the machine to materials of varying thicknesses. Again, by independently adjusting the bearing blocks for the cutter and creaser bars, which is accomplished by rotating the shafts 49 (Figs. 16 and 17), the said bars may be moved toward and from one another to vary the distance between the panel creases $g$ and flap-forming slots $e$ (Fig. 25). If the length of the blank varies, then the stop-plate 32, feeding-out roller 37 and cooperating presser roll 36, and the end knife 68, all of which are carried by a bracket 195 slidably mounted on the base, (Fig. 1), may be adjusted lengthwise of the machine by shifting the position of the bracket 195 on the base. When these parts are so adjusted, the upper cooperating knife 70 will be correspondingly adjusted by shifting the position of its supporting bar 71 on the upper frame.

Further, the side grips 42 may be simultaneously adjusted to blanks of different widths by releasing the arm 64 (Fig. 2), which is fixedly connected to the shaft 45, and rotating the shaft 45 by some suitable tool. Rotation of the shaft will move the gripping blocks 42 inwardly or outwardly, depending upon the direction in which the shaft is rotated.

The operation of the machine has been described, in connection with the detail description and, briefly, is as follows: The blank is placed between the feeding rolls which conduct the same between the shafts 25 and 26, upon which are located the devices for trimming the edges and forming the longitudinal or flap creases $f, f$. The blank is brought to rest with its forward end abutting the stop plate 32, which is in the position shown in Fig. 4. The cam 61 upon the cam shaft 57 actuates the side grips 42 to center the blank, and, subsequently, the cam 58 moves the clamping bar 55 downwardly to clamp the blank adjacent the front cutting knives 65, 66. The eccentrics upon the shafts 98, 98' thereupon move the frame 13 downwardly to shear the ends of the blank by means of the knives 65, 66 and 68, 70. At the same time the transverse cutting blades upon the cross-bars 72, 74 form the slots $e$. The frame 13 is then raised, and while the blank is still maintained in fixed position, the frame is again moved downwardly—the creasing members upon the cross-bars 72, 74 having, automatically, been moved into operative position, shown in Fig. 14—resulting in the formation of the transverse or panel creases $g$ between the slots $e$. Due to the fact that the blank is held in fixed position during both the creasing and cutting operations, and until both of these operations are completed, absolute registration or alignment of the panel creases and cuts or slots is insured. Subsequently, the side grips are released and the clamp 55 is raised, both being actuated by their respective cams, and thereafter, the cam 135 (Fig. 9) lowers the stop plate and the presser roller 36, the latter maintaining the blank in engagement with the continuously driven feeding-out roller 37 whereby to carry the blank out of the machine.

The blank may be fed into the machine by hand, or, if desired, a receiving table, such as is shown in Figs. 18 to 21, may be provided, from which the blanks will be automatically fed between the machine feed rollers. This table has its top 200 supported by vertical standards 201 and positioned with one end adjacent the feed rollers 19 of the machine. At the lower end of the standards the table carries side strips 203 on which are mounted brackets 204 supporting a rock-shaft 205 which, as here shown, is actuated from a crank pin 207 on the machine cam 58 through a link 206 connecting with an arm 209 fixed to the rock-shaft. Mounted upon the rock-shaft, between the brackets 204 are a pair of arms 210, each connected by a link 211 to one of a pair of parallel rods 212 slidably mounted in brackets 213 beneath the supporting surface of the table. The rods 212 are positioned beneath slots 214 in the table and are each connected, by means of a pin 215 extending through one of these slots, to a push-bar 216 extending across the table supporting surface. Reciprocation of the rods 212 will result in movement of the push-bar longitudinally of the table and the feeding of engaged blank between the feeding rollers 19. Obviously, the invention is not limited to this particular type of receiving table, since any suitable means may be employed for the purpose of supplying blanks to the machine.

I claim:

1. In a machine of the class described, the combination with a reciprocating head, of means carried by the head for creasing a blank, means carried by the head for cutting the blank adjacent the crease, and means for shifting the creasing and cutting means alternately into and out of operative position.

2. In a machine of the class described, the combination with a reciprocating head, of means carried by the head for creasing a blank, means carried by the head for cutting the blank adjacent the crease, means for shifting the creasing and the cutting means alternately into and out of operative position, and means for holding the blank in fixed position after one operation until the other is completed.

3. In a machine for making box blanks, the combination with a reciprocating head, of creasing means carried by said head, cutting means carried by the head, and means for reciprocating the head and for automatically bringing the creasing means and the cutting means alternately into operative position.

4. In a machine for making box blanks, the combination with a reciprocating frame, of a head movably mounted on said frame, cutting means carried by said head, creasing means carried by said head, and means for reciprocating the frame and for moving said head to bring the creasing and cutting means alternately into operative position.

5. In a machine for making box blanks, the combination with a reciprocating frame, of a head rotatably mounted on said frame, cutting means carried by said head, creasing means carried by said head, and means for reciprocating the head and for rotating the same to bring the creasing and cutting means alternately into operative position.

6. In a machine for making box blanks, the combination with a reciprocating frame, of a plurality of devices movably mounted on said frame, each of said devices carrying creasing means and cutting means, means for reciprocating said frame and means for automatically moving said devices to bring said cutting means and said creasing means alternately into operative position.

7. In a machine for making box blanks, the combination with a reciprocating frame, of a plurality of devices rotatably mounted on said frame, each of said devices carrying creasing means and cutting means, means for reciprocating said frame, and means for automatically rotating said devices to bring said cutting means and said creasing means alternately into operative position.

8. In a machine for making box blanks, the combination with a reciprocating frame, of a plurality of devices rotatably mounted on said frame, each of said devices carrying creasing means and cutting means, means for reciprocating said frame, means for automatically rotating said devices to bring said cutting means and said creasing means alternately into operative position, and means for holding the blank in fixed position until both the cutting and creasing operations are completed.

9. In a machine for making box blanks, the combination with a reciprocating frame, of a plurality of devices rotatably mounted on said frame, each of said devices carrying creasing means and cutting means, means for reciprocating said frame, means for automatically rotating said devices to bring said cutting means and said creasing means alternately into operative position, means for centering the blanks preliminary to the action of the cutting and creasing means, and means for clamping the blanks, said clamping means acting to hold the blanks in fixed position until both the cutting and creasing operations are completed.

10. In a machine for making box blanks, the combination with a reciprocating head, of creasing means carried by said head, cutting means carried by said head, a second relatively stationary head carrying cooperating cutting and creasing means, means for operating said reciprocating head and for automatically moving both of said heads to bring the cutting means and the creasing means alternately into operative position.

11. In a machine for making box blanks, a series of vertically aligned pairs of cross bars, means for feeding a blank between said bars, means for vertically reciprocating the upper of said series of bars, cooperating cutting means on said bars, cooperating creasing means on said bars, and means for automatically moving said bars to bring the creasing means and the cutting means alternately into operative position.

12. In a machine for making box blanks, a series of vertically aligned pairs of cross bars, means for feeding a blank between said bars, means for vertically reciprocating the upper of said series of bars, cooperating cutting means on said bars, cooperating creasing means on said bars, and means for automatically rotating said bars to bring the cutting means and the creasing means alternately into operative position.

13. In a machine for making box blanks, a support for the blank, a series of cross bars on said support, a series of cross bars above said support individually aligned with the first mentioned cross bars, cooperating creasing means on the aligned bars, cooperating cutting devices on the aligned bars, means for vertically reciprocating one of said series of bars, and means for automatically moving said bars to bring the cutting devices and the creasing means alternately into operative position.

14. In a machine for making box blanks, a support for the blank, a series of cross bars on said support, a series of cross bars above said support individually aligned with the first mentioned cross bars, cooperating creasing means on the aligned bars, cooperating cutting devices on the aligned bars, means for vertically reciprocating the upper of said series of bars, and means for automatically moving said bars to bring the cutting devices and the creasing means alternately into operative position.

15. In a machine for making box blanks, a support for the blank, a series of cross bars on said support, a series of cross bars above said support individually aligned with the first mentioned cross bars, cooperating creasing means on the aligned bars, cooperating cutting devices on the aligned bars, means for vertically reciprocating the upper of said series of bars, and means for automatically rotating said bars to bring the cutting devices and the creasing means alternately into operative position.

16. In a machine for making box blanks, a stationary frame adapted to serve as a support for a blank, a vertically reciprocating frame above said stationary frame, a plurality of vertically aligned cross bars on said frames, cooperating cutting devices on said cross bars, cooperating creasing devices on said bars, and means for rotating said bars to bring said cutting devices and said creasing means alternately into operative position.

17. In a machine for making box blanks, a support for the blank, means for automatically centering a blank upon said support, a series of cross bars on said support, a series of cross bars above said support individually aligned with the first mentioned cross bars, cooperating cutting devices on the aligned bars, cooperating creasing devices on the aligned bars, means for vertically reciprocating one of said series of bars, and means for automatically moving said bars to bring the cutting devices and the creasing devices alternately into operative position.

18. In a machine for making box blanks, a support for the blank, means for automatically centering a blank upon said support, means for automatically trimming the sides and ends of the blank, a series of cross bars on said support, a series of cross bars above said support individually aligned with the first mentioned cross bars, cooperating cutting devices on the aligned bars, cooperating creasing devices on the aligned bars, means for vertically reciprocating one of said series of bars, and means for automatically moving said bars to bring the cutting devices and the creasing devices alternately into operative position.

19. In a machine for making box blanks, a stationary frame adapted to serve as a support for a blank, a vertically reciprocating frame above said stationary frame, a plurality of vertically aligned cross bars on said frames, cooperating cutting devices on said cross bars, cooperating creasing devices on said bars, means for rotating said bars to bring said cutting devices and said creasing means alternately into operative position, and means for adjusting said bars longitudinally of said frames to accommodate the machine to blanks of various sizes.

20. In a machine for making box blanks, a stationary frame adapted to serve as a support for a blank, a vertically reciprocating frame above said stationary frame, a plurality of vertically aligned cross bars on said frames, cooperating cutting devices on said cross bars, cooperating creasing means on said bars, and means for rotating said bars to bring said cutting devices and said creasing means alternately into operative position and for independently adjusting the pairs of aligned bars longitudinally of the frames.

21. In a machine for making box blanks, a support for the blank, a series of cross bars on said support, a series of cross bars above said support individually aligned with the first mentioned cross bars, cooperating creasing means on the aligned bars, cooperating cutting devices on the aligned bars, means for vertically reciprocating one of said series of bars, means for automatically moving said bars to bring the cutting devices and the creasing means alternately into operative position, and means for adjusting the pairs of aligned bars longitudinally of the support.

22. In a machine for making box blanks, a support for the blank, a series of cross bars on said support, a series of cross bars above said support individually aligned with the first mentioned cross bars, cooperating creasing means on the aligned bars, cooperating cutting devices on the aligned bars, means for vertically reciprocating one of said series of bars, means for automatically moving said bars to bring the cutting devices and the creasing means alternately into operative position, and means for independently adjusting the pairs of aligned bars longitudinally of the support.

23. In a machine of the class described, the combination with a reciprocating head, means carried by the head for creasing a blank transversely, spaced devices carried by the head for cutting the blank transversely, means for adjusting the cutting devices relative to one another along said head, means for shifting the creasing means and the cutting devices alternately into and out of operative position, and means for reciprocating the head.

24. In a machine for making box blanks, the combination with a support for a blank, of a reciprocating frame above said support, cross bars carried by said frame, cutting devices on each cross bar, creasing means on each cross bar, means for reciprocating the frame and for automatically bringing the creasing means and the cutting devices alternately into and out of operative position, and means for adjusting the cutting devices on each cross bar toward and from one another to accommodate the machine to blanks of different widths.

25. In a machine for making box blanks, a support for a blank, a reciprocating frame above said support, a cross bar on said frame, cutting knives spaced on said cross bar, creasing means on said cross bar between said cutting knives but off-set therefrom, means for reciprocating the frame, and means for automatically rotating said cross bar to bring the creasing means and the cutting devices alternately into and out of operative position.

26. In a machine for making box blanks, a support for a blank, a reciprocating frame above said support, a cross bar on said frame, cutting knives spaced on said cross bar, creasing means on said cross bar between said cutting knives but off-set therefrom, means for reciprocating the frame, means for adjusting said cutting devices along the cross bar toward and from one another to vary the length of the cut made thereby, and means for automatically rotating said cross bar to bring the creasing means and the cutting devices alternately into and out of operative position.

27. In a machine for making box blanks, the combination with a support for a blank, a reciprocating frame above said support, a plurality of cross bars on said frame, each cross bar having means for creasing the blank transversely and cutting devices adapted to cut the blank at opposite ends of each crease, means for reciprocating said frame, means for simultaneously adjusting the knives on the cross bars toward and from one another, and means for automatically rotating said cross bars to bring the creasing means and the cutting devices alternately into and out of operative position.

28. In a machine for making box blanks, the combination of a support for a blank, side gripping devices associated with said support adapted to grip and to center the blank thereon, additional means for clamping the blank, a reciprocating frame above said support, a plurality of cross bars on said frame, cutting and creasing devices on each cross bar, means for automatically actuating said gripping devices, means for imparting two reciprocations to said frame while the gripping devices maintain the blank in fixed positon, means for moving said bars in the frame to bring the creasing and the cutting devices alternately into and out of operative position whereby the two reciprocations of the frame result in the creasing and cutting of the blank, means for releasing the gripping devices, and means for removing the blank from the machine.

29. In a machine for making box blanks, a support for a blank, a vertically reciprocable head above said support, cutting knives spaced apart on said head, a creasing device on said head between the cutting knives but off-set therefrom, a stationary head on said support, complemental cutting and creasing devices on said stationary head, means for reciprocating said reciprocable head, and means for automatically moving both of said heads to bring the cutting devices and the creasing devices alternately into and out of operative position.

30. In a machine for making box blanks, a support for a blank, a plurality of vertically reciprocable cross bars above said support, cutting devices on each of said cross bars, and creasing devices on each cross bar between the cutting devices but off-set therefrom, cross bars on said support placed individually beneath the cross bars above said support, complemental cutting and creasing devices on said last mentioned cross bars, means for vertically reciprocating the first mentioned cross bars, and means for automatically moving all of said cross bars to bring the cutting devices and the creasing devices alternately into and out of operative position.

31. In a machine for making box blanks, as specified in claim 29, means for adjusting said cutting devices on both of the heads toward and from one another longitudinally of the heads.

32. In a machine for making box blanks, as specified in claim 30, means for adjusting the cutting devices on all of the cross bars longitudinally of the bars toward and from one another.

33. In a machine for making box blanks, as specified in claim 30, means common to all of the cross bars for simultaneously adjusting the cutting devices on all of the cross bars longitudinally of the bars toward and from one another.

In testimony whereof I affix my signature.

JAMES B. LADD.